United States Patent [19]

Kurland et al.

[11] 4,117,605

[45] Oct. 3, 1978

[54] REAL TIME CONVERSATIONAL TOY HAVING SECURE PLAYBACK RESPONSE

[75] Inventors: Lawrence G. Kurland, Melville, N.Y.; Michael J. Freeman, 12 Maplewood Rd., Hartsdale, N.Y. 10530

[73] Assignee: Michael J. Freeman, Hartsdale, N.Y.

[21] Appl. No.: 699,433

[22] Filed: Jun. 24, 1976

[51] Int. Cl.² .............................................. G09B 7/04
[52] U.S. Cl. .................................... 35/9 A; 35/8 A; 360/69; 360/132
[58] Field of Search .................. 46/232; 35/5, 6, 9 A, 35/8 A, 35 C; 360/60, 69, 132, 71; 235/61.7 B; 340/147 MD

[56] References Cited

U.S. PATENT DOCUMENTS

| | | | |
|---|---|---|---|
| 2,777,901 | 1/1957 | Dostert | 35/35 C |
| 2,908,767 | 10/1959 | Fritzinger | 35/35 C |
| 3,080,679 | 3/1963 | Hardigan | 46/232 |
| 3,141,243 | 7/1964 | Chapman et al. | 35/9 A |
| 3,194,895 | 7/1965 | Treadwell | 35/8 A |
| 3,255,536 | 6/1966 | Livingston | 35/9 A |
| 3,343,280 | 9/1967 | Tolnai | 35/35 C |
| 3,484,950 | 12/1969 | Serrell et al. | 35/9 A |
| 3,560,964 | 2/1971 | Bedell et al. | 35/5 |
| 3,641,684 | 2/1972 | Paige | 35/8 A |
| 3,650,378 | 3/1972 | Kakiuchi et al. | 360/60 |
| 3,665,164 | 5/1972 | Beveridge et al. | 235/61.7 B |
| 3,736,410 | 5/1973 | Ragland et al. | 235/61.7 B |
| 3,755,641 | 8/1973 | Rackman | 360/60 |
| 3,763,577 | 10/1973 | Goodson | 35/48 R |
| 3,774,316 | 11/1973 | Meir | 35/8 A |
| 3,787,714 | 1/1974 | Resnick et al. | 340/147 MD |
| 3,825,947 | 7/1974 | Rubin et al. | 360/60 |
| 3,839,736 | 10/1974 | Hoshall | 360/60 |
| 3,947,972 | 4/1976 | Freeman | 35/9 A |

OTHER PUBLICATIONS

Sifferlen, T. P. & Vartania, V.; Digital Electronic with Engineering Applications; Prentice-Hall 1975, p. 8.

Primary Examiner—Stephen C. Pellegrino
Assistant Examiner—Arthur S. Rose
Attorney, Agent, or Firm—Hubbell, Cohen, Stiefel & Gross

[57] ABSTRACT

A real time conversational verbal interactive toy apparatus capable of providing a conversational type response to an interrogatory message from a removably insertable magnetic storage medium which comprises a plurality of coextensive multipurpose audio tracks contained in a housing includes a multipurpose selection apparatus for directly selecting one of the tracks for reproducing the selected information stored thereon, such as a multiple choice response to the interrogatory message, an insertion security apparatus operatively associated with a receptacle therein for providing an insertion condition for the inserted received magnetic storage medium housing with respect to the receptacle, the storage medium housing having a playback authorization code disposed thereon, the insertion security apparatus comprising elements responsive to this code for providing the insertion condition therefrom, and a condition responsive network operatively associated with the insertion security apparatus for controllably enabling the provision of a secure selected multiple choice playback response from the storage medium. Each track stores information in reproducible segments which are spatially related in time along the tracks and related in content to the corresponding segments on the other coextensive tracks of the plurality for providing the real time conversational type response. The condition responsive network is responsive to the provision of the insertion condition for providing the enable condition to a playback head only when the provided insertion condition corresponds solely to the playback authorization code so that only media capable of providing the aforementioned type of response may be employed.

24 Claims, 18 Drawing Figures

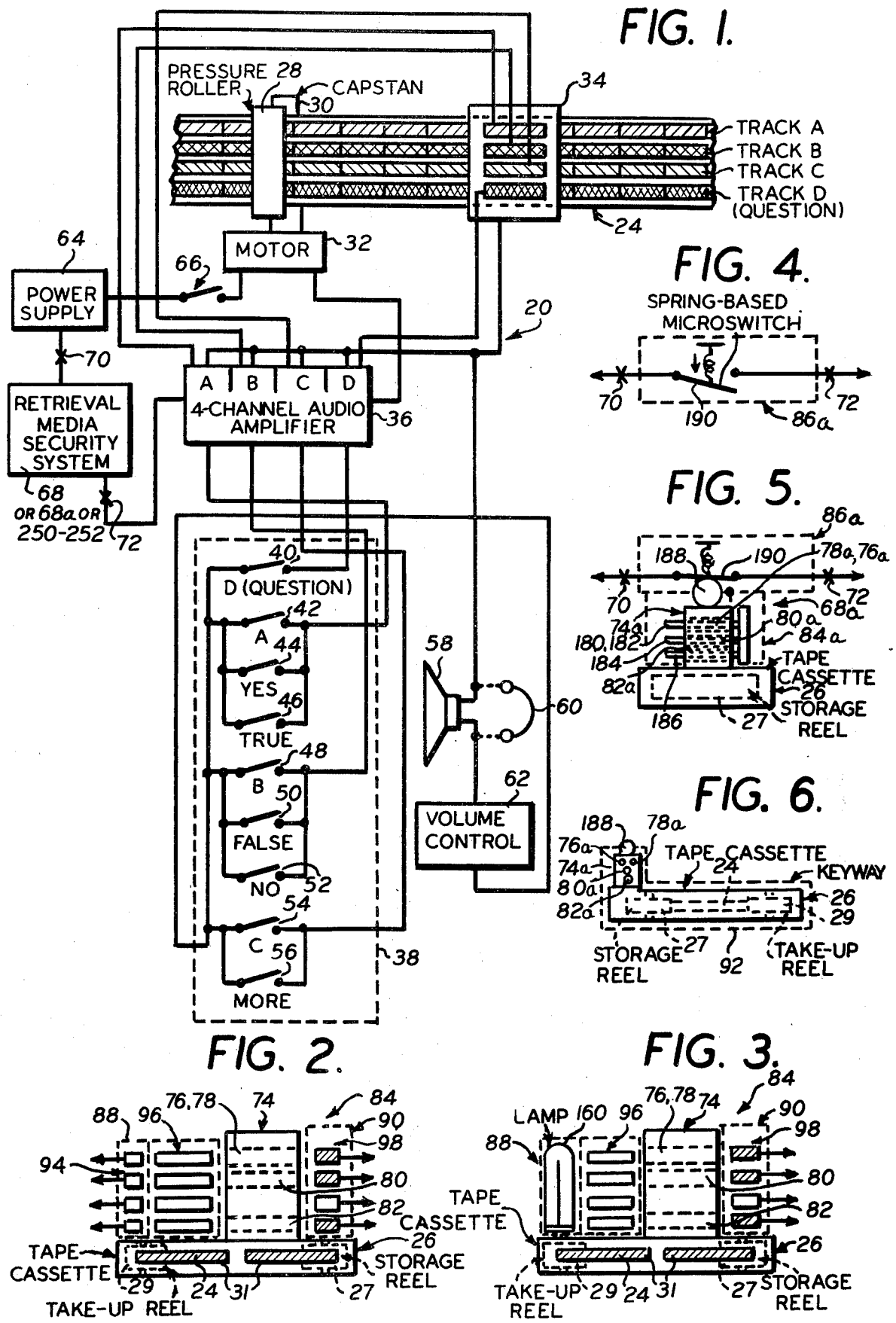

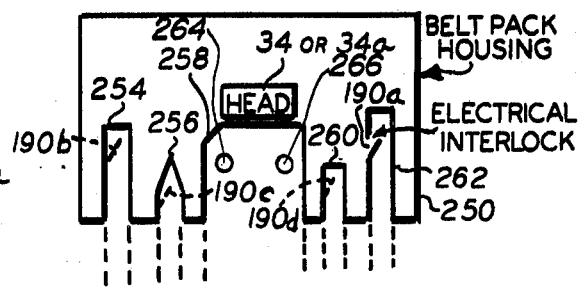
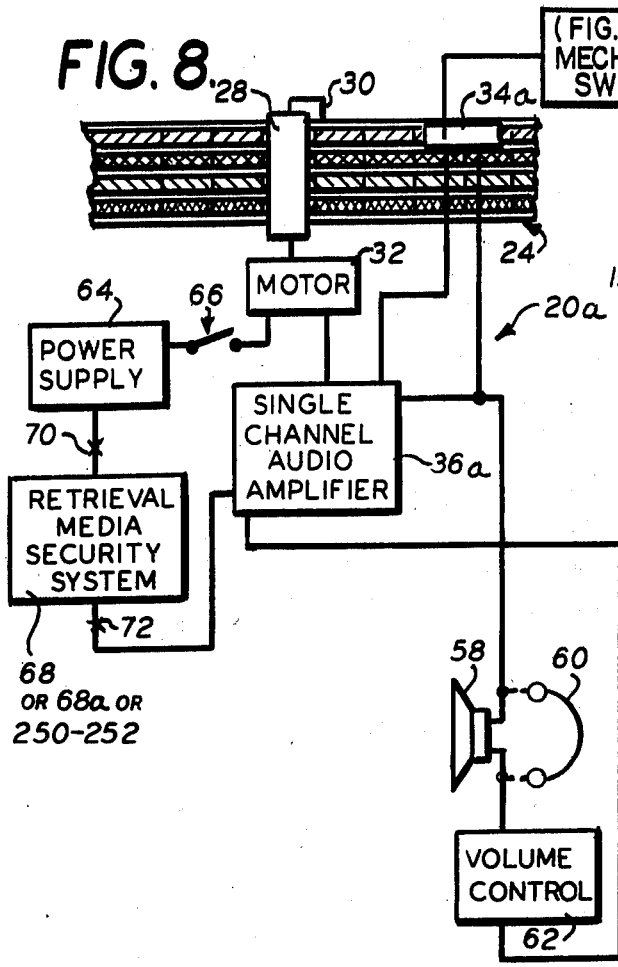
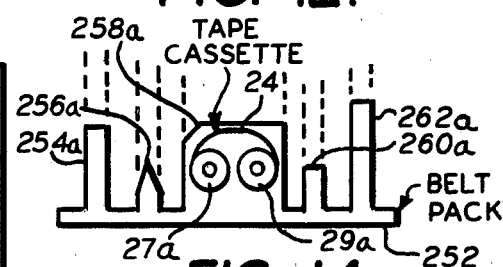
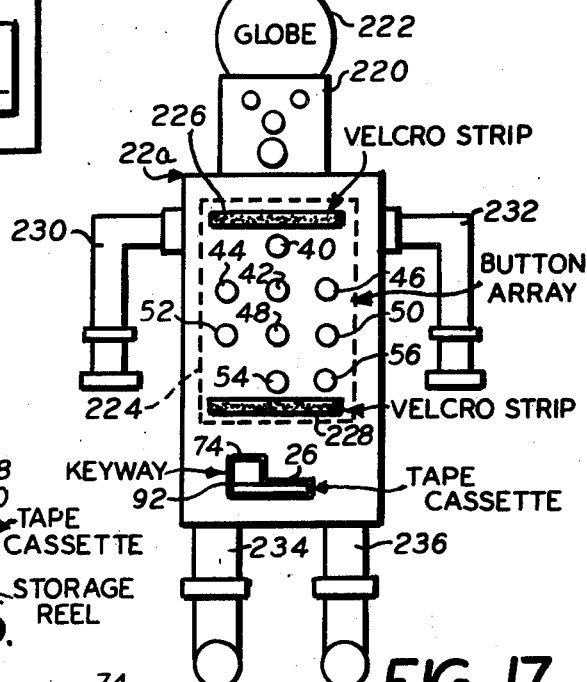
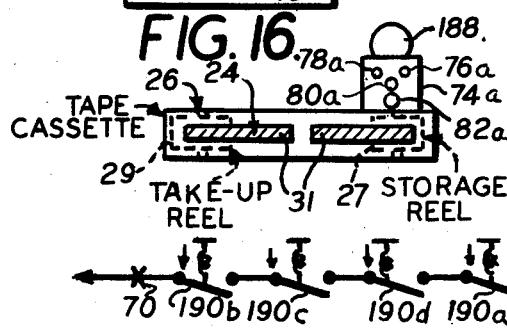
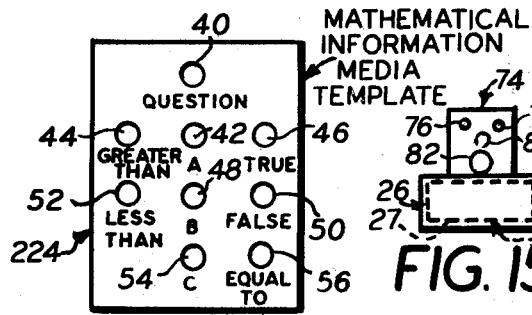
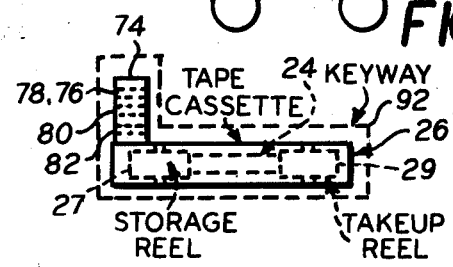

REAL TIME CONVERSATIONAL TOY HAVING SECURE PLAYBACK RESPONSE

CROSS-REFERENCE TO RELATED APPLICATIONS

This application is related to the commonly owned copending U.S. patent applications entitled "Real Time Conversational Toy," by Michael J. Freeman application Ser. No. 699,456 now U.S. Pat. No. 4,078,316, and "Improved Secure Playback Response Apparatus," by Lawrence G. Kurland, application Ser. No. 699,453, both of which were contemporaneously filed herewith and the contents of both of which are specifically incorporated by reference herein in their entirety.

BACKGROUND OF THE INVENTION

1. Field of the Invention

The present invention relates to real time conversational response verbal interactive toy apparatus capable of providing a secure playback response from a removably insertable magnetic storage medium.

2. Description of the Prior Art

Verbal interactive apparatus for providing playback responses from removably insertable magnetic storage media having a housing for such storage media, such as what are commonly termed cassette recorders are well known, such as the real time conversational student response teaching apparatus described in U.S. Pat. No. 3,947,972. Under certain circumstances, it is desirable to insure that only properly authorized tapes may be played on a particular verbal interactive playback response apparatus, such as the aforementioned cassette recorder, one such exemplary instance being where the verbal interactive apparatus is rented on a subscription or "pay-for-play" basis and another such exemplary instance being where the verbal interactive playback device is only properly operable to provide a real time conversational response when the storage medium contains a predetermined unique recording format, such as the type of format described in the aforementioned U.S. Pat. No. 3,947,972. Some prior art attempts to provide security for playback of such magnetically recorded storage media or tapes have primarily concentrated on putting some type of sense marking or code on the tape itself. However, this approach has resulted, at times, in distortion of the tape as well as potential problems in properly sensing such codes under erroneous tape playback conditions, such as due to wow and flutter. In addition, if such playback security is desired in a relatively inexpensive verbal interactive toy, then sophisticated security systems cannot economically be utilized as their cost may well exceed the cost of the playback device itself. These disadvantages of the prior art are overcome by the present invention.

SUMMARY OF THE INVENTION

A real time conversational verbal interactive toy apparatus for providing a real time secure conversational type response to an interrogatory message contained on a removably insertable magnetic storage medium having a housing for the storage medium is provided. The magnetic storage medium comprises a plurality of coextensive multipurpose audio tracks capable of having audio information stored thereon for multipurpose audio playback therefrom, such as for providing multiple choice answers, YES/NO type answers or TRUE/FALSE type answers. Receptacle means, such as a unique keyway, for removably receiving the inserted storage medium housing with the storage medium in a playback position thereof is provided in a robot-like housing for the verbal interactive toy apparatus. Audio playback means, such as a movable single track head operable in conjunction with a single track audio amplifier or a multitrack head for use with a multichannel audio amplifier, are positionable adjacent the multitrack storage medium and in alignment therewith in the playback position of the received inserted storage medium housing for selectively obtaining the stored audio information from each of the coextensive tracks.

Multiple choice multipurpose selection means, such as a plurality of switches with one such switch being associated with each of the plurality of audio tracks, are operatively connected to the playback means for directly selecting one of the tracks for reproducing the selected information stored thereon in accordance with a predetermined purpose for the multipurpose audio track. In order to provide a variable purpose for the various tracks, the switches may comprise a parallel connected switch bank having a separately operable switch member for each of the multiple purposes which may be designated by indicia or labels on a removable template removably mountable on the robot-like housing. A mechanical interlock is provided for insuring that only one of the switch members and, correspondingly, only one of the plurality of switches, may be operable at a time for enabling the direct selection of the associated track dependent on the predetermined purpose, such purpose being defined in the interrogatory message. The removable template is preferably provided along with the multitrack storage medium for insuring that the proper indicia or purposes are designated for the various switches and switch members comprising the multiple choice multipurpose selection means.

As was previously mentioned, audio output means, such as a single channel audio amplifier when a single track playback head is used and a multichannel audio amplifier when a multitrack playback head is used, is operatively connected to the playback means and the direct selection means for directly providing the selected track information from the selectively obtained stored audio information for selectively reproducing the information as an audio output therefrom. This information is stored on each track in a plurality of reproducible information segments, with each of the segments comprising a complete message reproducible by the playback means directly in response to the selection of the track upon which the segments are stored. Each of the information segments on each one of the coextensive tracks is spatially related in real time along the tracks and related in content to the information segments on the other of the coextensive tracks in the plurality thereof with at least one of the coextensive tracks stored information comprising interrogatory messages and with the other of the coextensive tracks stored information comprising selectable responsive messages spatially related along the other tracks in such real time and related in content to the interrogatory messages dependent on the predetermined purpose for the multipurpose audio track. Most preferably, each of the tracks contains the identical interrogatory message spatially related in time with one of the tracks being the primary interrogatory message or question track while the other tracks also contain the aforementioned selectable responsive messages.

In addition, in conjunction with the multipurpose function of the tracks, at least one of the plurality of these other tracks which contain responsive messages, further comprises additional descriptive information relating to the content of the correct selectable responsive message. In such an instance, the primary interrogatory message track contains a subsequent different particular interrogatory message related in real time but unrelated in content to the additional information on the one additional information containing track with the other responsive message tracks containing selectable responsive messages related in real time and content to the subsequent different particular interrogatory message and related in real time but unrelated in content to the additional information. This feature is known as the "more information" feature and the switch means associated with the other responsive message tracks have a different selectable purpose for the subsequent different particular interrogatory message than for the particular interrogatory message related to the additional information. For example, if a particular interrogatory message initially provides a multiple choice selection involving all of the responsive message tracks, with the additional suggestion that "more information" can be provided by selecting a particular track, then the next successive interrogatory message will be the type of question, such as TRUE/FALSE or YES/NO involving only the responsive message tracks which do not have the "more information" or additional information contained thereon, with this additional information being spatially related in time along the track to the responsive messages being provided with respect to the successive interrogatory message so that all of the tracks are ready to receive the next subsequent interrogatory message at the completion of the additional information which occurs, in real time, simultaneously with the completion of the responsive messages relating to the previous successive interrogatory TRUE/FALSE or YES/NO type of interrogatory message.

The aforementioned removably insertable magnetic storage medium having a housing for the storage medium may be such as a reel-to-reel type cassette with the verbal interactive toy including insertion security means operatively associated with the receptacle means for providing an insertion condition for the inserted received magnetic storage medium housing with respect to the receptacle means and condition responsive means operatively associated with the insertion security means for controllably enabling the provision of the selected playback response from the multitrack storage medium. The storage medium housing has means disposed thereon comprising an authorization code for playback of the storage medium, such as an optically readable code from which a corresponding digital signal may be provided. The insertion security means comprises means responsive to the playback authorization code for providing the insertion condition therefrom, such as an illumination source and a photodetector matrix array wherein the optically readable authorization code provided on the housing comprises a plurality of light transmitting passageways in the housing disposable in the insertion security means between the illumination source, such as a plurality of light emitting diodes, and the photodetector matrix array, such as a plurality of phototransistors, in optical registration therewith for enabling selective illumination of the photodetector matrix array through the housing light transmitting passageways for providing digital signal information dependent on the selectively illuminated photodetector matrix array. If desired, light transmitting optical fibers may be utilized with each one of the fibers being optically registrable with a given one of the passageways for illuminating a given one of the photodetectors in the array. The playback means, such as the tape drive, audio amplifier and magnetic playback head, have an enable condition and a disable condition for enabling the provision of the selected playback response recorded on the multitrack magnetic storage medium therefrom only in the enable condition thereof. The condition responsive means may preferably include a logic gating network, such as an AND gate operatively connected to receive the digital signal information corresponding to the predetermined authorization code for providing a first authorization logic output condition when this information corresponds to the predetermined authorization code, an OR gate operatively connected to receive the digital signal information corresponding to an unauthorized playback code for providing a first state output condition when it corresponds to this unauthorized code and a second state output condition when it does not correspond to this unauthorized code, a logic inverter operatively connected to the output of the OR gate for inverting the state output condition thereof for providing a second authorization logic output condition therefrom only when the second state output condition is provided thereto from the OR gate, and another AND gate operatively connected to the previous AND gate and OR gate outputs for providing the enable condition solely when the first and second authorization logic output conditions are present. This logic gating network is responsive to the insertion condition for providing the enable condition to the playback means only when the provided insertion condition corresponds to a predetermined playback authorization code, whereby playback security for the verbal interactive toy apparatus is provided. Preferably, the verbal interactive toy apparatus includes power source means for providing power to enable operation of the playback means with the condition responsive means being operatively connected between the power source and the playback means for enabling provision of the power to the playback means solely in the enable condition thereof. The enable condition providing means may comprise a transistor switch operatively connected to the aforementioned AND gate output which provides the enable condition therefrom for providing the enable condition solely when the first and second authorization logic output conditions are present.

The aforementioned playback security system which comprises the insertion security means and condition responsive means may also be achieved by employing means disposed on the cassette housing having passageways therein which are registrable with pins insertable therethrough when the proper passageway configuration or authorization code is provided, thereby placing the cassette housing in the aforementioned playback position. In such an instance, a switch activation means, such as a protrusion, such as a globe, from the cassette housing are provided which cooperate with a spring-biased microswitch, which switch is normally biased to the disable condition, for closing the microswitch to provide the enable condition. This microswitch, in such an instance, is preferably connected between the aforementioned power supply and the playback means to control the provision of power thereto. Moreover, the verbal interactive toy apparatus may include a belt pack type housing having a plurality of uniquely configured apertures with the cassette housing comprising a belt-pack having an equal plurality of complementary protrusions thereon and with one or more thereof comprising such switch activation means for operating one or more of such microswitches, such as a series circuit arrangement thereof.

BRIEF DESCRIPTION OF DRAWINGS

FIG. 1 is a diagrammatic illustration, partially in schematic and partially in block, of one embodiment of the preferred verbal interactive toy employing the preferred playback security system of the present invention for providing a secure conversational playback response;

FIG. 2 is a diagrammatic illustration of the presently preferred embodiment of the insertion security portion of the playback security portion of the present invention illustrating a rear view of a preferred exemplary reel-to-reel tape cassette for use therewith;

FIG. 3 is a diagrammatic illustration, similar to FIG. 2, of an alternative embodiment of the presently preferred insertion security portion of the present invention;

FIG. 4 is a diagrammatic illustration of the condition responsive portion of an alternative embodiment of the playback security portion of the present invention;

FIG. 5 is a diagrammatic illustration, similar to FIG. 4, of the complete alternative embodiment of the playback security system of the present invention showing an exemplary preferred reel-to-reel cassette, in a side view thereof, in position with an insertion condition corresponding to a predetermined playback authorization code;

FIG. 6 is a diagrammatic illustration of the preferred receptable portion of the verbal interactive toy of the present invention, illustrating the cassette of FIGS. 5 and 6, in a front view thereof, inserted therein;

FIG. 8 is a diagrammatic illustration, similar to FIG. 1, of the presently preferred embodiment of the verbal interactive toy of the present invention employing the preferred playback security system of the present invention for providing a secure conversational playback response;

FIGS. 11 and 12 are diagrammatic illustrations of another playback security system for use in the robot-like housing of FIG. 10;

FIG. 13 is a diagrammatic illustration of an alternative embodiment of a template for use with the robot-like housings of FIGS. 10 and 14;

FIG. 14 is a front elevational view of a robot-like housing for use with the verbal interactive toy in accordance with the present invention, employing the receptacle of FIG. 6 or FIG. 17;

FIG. 15 is a side elevational view, similar to FIG. 5, of the exemplary reel-to-reel cassette of either FIG. 2 or FIG. 3;

FIG. 16 is a rear elevational view, similar to FIGS. 2 and 3, of the exemplary reel-to-reel cassette of FIGS. 5 and 6;

FIG. 17 is a diagrammatic illustration, similar to FIG. 6, of the receptacle portion of the verbal interactive toy of the present invention, illustrating the cassette of FIGS. 2 or 3 and 15 in front view thereof, inserted therein; and FIG. 18 is a diagrammatic illustration, similar to FIG. 4, of a series circuit alternative embodiment of the electrical interlock portion of the playback security system of FIGS. 11 and 12.

DETAILED DESCRIPTION OF THE PREFERRED EMBODIMENT

Figure 7:
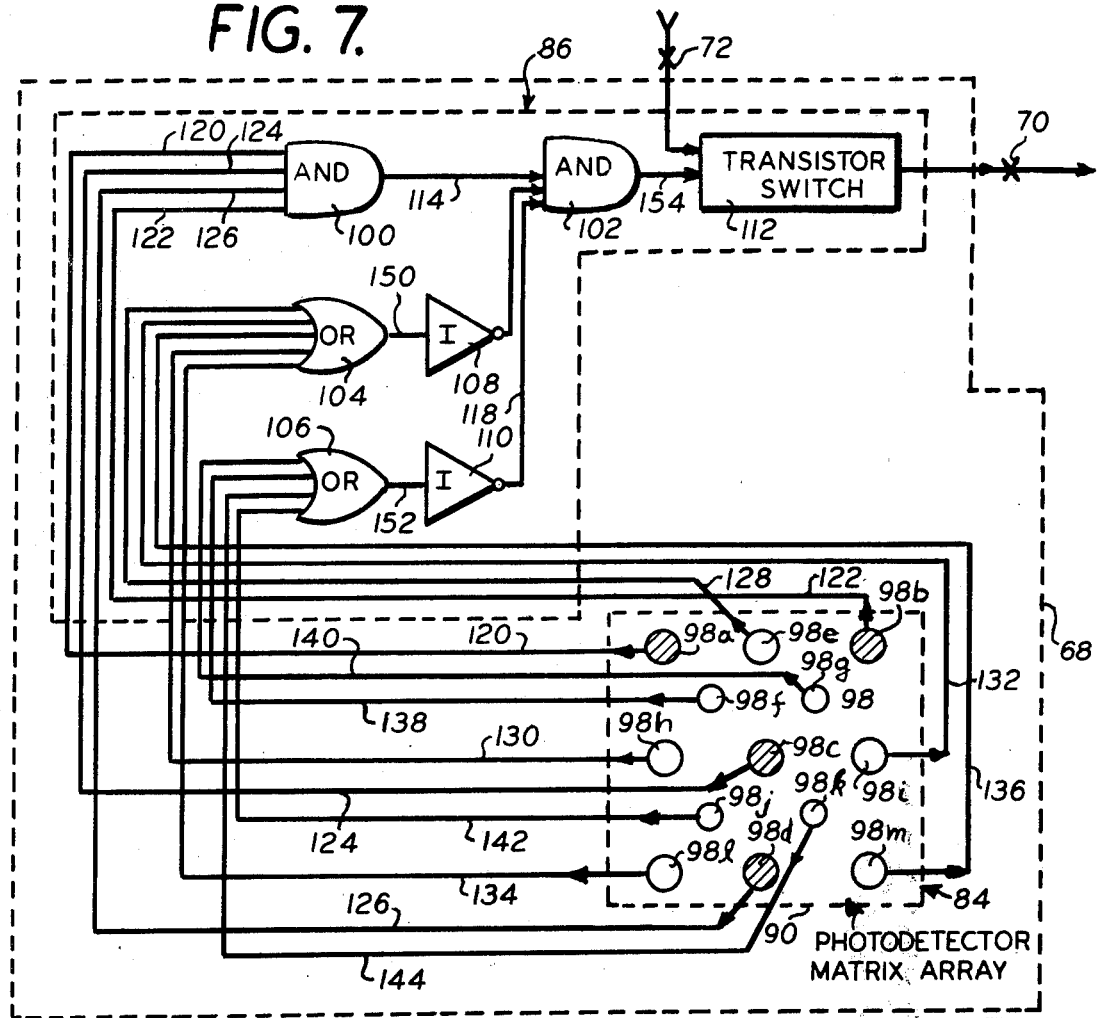
FIG. 7 is a logic schematic diagram, partially in block of the presently preferred playback security system of the present invention employing the insertion security portion illustrated in FIG. 2.

Referring now to the drawings in detail and initially to FIG. 1 thereof, one embodiment of the preferred verbal interactive toy of the present invention for providing a secure conversational type playback response from a removably insertable magnetic storage medium, the apparatus generally being referred to by the reference numeral 20, is shown. The presently preferred embodiment of the verbal interactive toy 20a is shown in FIG. 8 and shall be described subsequently with reference thereto. The apparatus 20 illustrated in FIG. 1 preferably provides a verbal interactive toy capable of providing a real time conversational user response apparatus, such as the type of apparatus described in U.S. Pat. No. 3,947,972, or the copending aforementioned commonly owned U.S. patent applications, the contents of which are specifically incorporated by reference herein in their entirety, and may be housed in a robot-like housing 22, such as the type illustrated in FIG. 10, or 22a, such as the type illustrated in FIG. 14, as will be described in greater detail hereinafter. The verbal interactive or conversational user response toy apparatus 20 preferably conventionally employs a magnetic storage medium, such as preferably a multitrack magnetic tape 24, which is conventionally housed in a housing therefor, such as a conventional type of reel-to-reel tape cassette housing 26 (FIGS. 2, 3, 5, 6, 15, 16, 17) for conventional capstan drive thereof. The tape 24 is preferably conventionally stored in cassette housing 26 between a storage reel 27 and a take-up reel 29 with a conventional window 31 being provided at one portion of the housing 26 for enabling operative engagement therewith with a conventional multitrack magnetic playback head 34. A conventional pressure roller 28 and capstan 30 which are driven by a conventional motor drive 32 are illustratively shown in FIG. 1 for providing the aforementioned conventional capstan drive of the multitrack magnetic tape 24. As will be described in greater detail hereinafter, the conventional multitrack magnetic playback head 34 selectively reads or plays back the information stored on a given one of the multiple audio track, by way of example, on tape 24, with four such tracks labeled A, B, C, and D being illustratively shown in FIG. 1, and with track D thereof being termed the question or interrogatory track as will be described in greater detail hereinafter because of the nature of the information stored thereon. Although the lowermost track, track D is illustratively shown as the question track, any of the tracks A-D could be designated as the question track is desired. Moreover, as will further be described in greater detail hereinafter, the information is preferably stored on the tracks of the magnetic tape 24 in a plurality of reproducible information segments, each of which preferably comprises a complete message which is reproducible directly in response to the selection of the track upon which the segments are stored. The extent of the segments are illustratively represented in FIGS. 1, 8 and 9 by the spacing between a pair of solid vertical lines on a given track. This is similar to the manner of operation of the conversational student response teaching apparatus described in U.S. Pat. No. 3,947,972.

Figure 9:
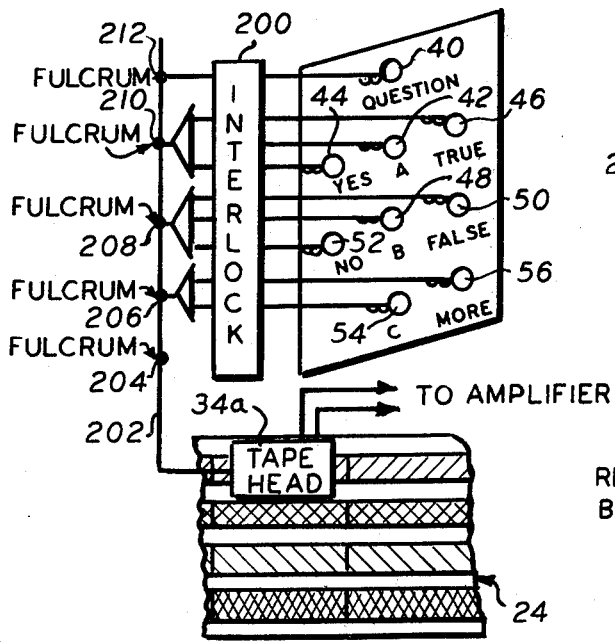
FIG. 9 is a diagrammatic illustration of the mechanical arrangement of the selection buttons associated with the verbal interactive toy of FIG. 8.

In order to provide playback of the information magnetically stored on tape 24, a conventional four channel audio amplifier 36 may be provided which is operatively connected to playback head 34 as shown in FIG. 1, or a conventional single channel audio amplifier 36a may be utilized with a conventional single track magnetic playback head 34a which may be mechanically shifted from track to track as shown in FIGS. 8 and 9. The four channel audio amplifier 36 preferably has one channel for each of the four tracks A, B, C and D in the example shown in FIG. 1 so as to conventionally playback the information stored on the respective audio track selected. The output of audio amplifier 36 is preferably connected to a multiple choice selection device 38, to be described in greater detail hereinafter, which preferably comprises a plurality of conventional switches 40, 42, 44, 46, 48, 50, 52, 54 and 56 with at least one switch being provided for each channel or track of multitrack audio tape 24. In the example shown in FIG. 1, switch 40 corresponds to the question track or track D, switches 42, 44 and 46, which comprise a multiple purpose switch, are connected in parallel and correspond to track A, switches 48, 50 and 52, which comprise another multiple purpose switch, are connected in parallel and correspond to track B, and switches 54 and 56, which comprise still another multiple purpose switch, are connected in parallel and correspond to track C. Each of the aforementioned switches 40 through 56, inclusive, is conventionally connected to the appropriate channel output of audio amplifier 36. These switches may be conventional push button switches having a mechanical interlock therebetween, such as will be described in greater detail with reference to FIG. 9, so that only one switch may be closed at a time, the switch being latched in the closed position when depressed and released when another switch is depressed of the grouping. The aforementioned switches 40 through 56, inclusive, are preferably connected between the output of the audio amplifier 36 and a conventional audio output device, such as a conventional loudspeaker 58 or a conventional pair of earphones 60 through a conventional volume control 62, such as a rheostat, and therefrom back to the audio amplifier 36 to complete the circuit.

As is shown and preferred in FIG. 1, a conventional power supply 64, such as either a DC power supply or an AC power supply, depending on the desired operating conditions of the verbal interactive toy apparatus 20, is provided for supplying power to enable the operation of the motor 32 and the audio amplifier 36 and balance of the verbal interactive toy apparatus 34-58-60-62-38. As presently preferred, a DC power supply is preferable when the apparatus 20 comprises the verbal interactive or conversational user response toy since it will then have one of the normally desired toy attributes of portability. In either event, with respect to FIG. 1, assuming that the audio amplifier 36 and the tape drive 28-30-32 have power supplied thereto, when any one of the switches 40 through 56, inclusive, is closed, the output of the corresponding audio track A, B, C or D, all of which are being provided to audio amplifier 36 by multitrack playback head 34, is selectively provided to the audio output device 58 or 60 to be heard by the user. A conventional on/off switch 66 is also preferably provided for enabling the user to conventionally turn the apparatus 20 on or off. However, as shown and most preferred in FIG. 1, the preferred verbal interactive toy apparatus 20 also preferably includes the preferred playback security apparatus or retrieval media security system 68 of the present invention, to be described in greater detail hereinafter with respect to FIGS. 2–7, 9–12 and 14–17, which is preferably operatively connected at points 70 and 72 between the audio amplifier 36 and the power supply 64 in FIG. 1, or the audio amplifier 36a and the power supply 64 in FIG. 8, so as to enable the provision of power to the verbal interactive apparatus 20 (FIG. 1) or 20a (FIG. 8) solely when the inserted tape cassette housing 26 enables the provision of a predetermined playback authorization code whose detection provides an enable condition to complete the circuit between points 70 and 72. Thus, as will be described in greater detail hereinafter, even if on/off switch 66 is closed, the verbal interactive toy apparatus 20 or 20a will not operate unless the predetermined playback authorization code has been detected by the preferred playback security system 68 so as to enable the completion of the circuit between points 70 and 72.

Before describing the overall verbal interactive toy apparatus 20 and its operation in any greater detail, the presently preferred embodiment of the playback security system 68 employed therein shall now be described in greater detail hereinafter, initially with reference to FIGS. 2, 7, 14, 15 and 17. Referring initially to FIGS. 2, 14, 15 and 17, the preferred tape cassette housing 26, which is shown in a rear view thereof in FIG. 2, preferably includes an upstanding portion 74 having a plurality of passageways, with four such passageways 76, 78, 80 and 82 being illustratively shown in the embodiment of FIGS. 2, 7, 15 and 17, arranged in a predetermined pattern for providing a predetermined playback authorization code associated with the storage media or multitrack tape 24 contained within the cassette housing 26. As will be described in greater detail hereinafter, this predetermined authorization code provided via passageways 76, 78, 80 and 82 by way of example, is an optically readable code. In such an instance, the playback security system 68 preferably includes an insertion security portion 84 which is responsive to the optically readable playback authorization code for providing an insertion condition therefrom, and a condition responsive portion 86, such as most preferably a condition responsive logic network, operatively associated with the insertion security portion 84, as will be described in greater detail hereinafter with reference to FIG. 7, for controllably enabling the provision of the playback response from the multitrack tape 24 in response to the playback authorization code detected with respect to the inserted tape cassette housing 26.

The insertion security portion 84 preferably includes an illumination source 88 and a photodetector matrix array 90 with the tape cassette housing 26 preferably being removably insertable into a keyway 92 (FIGS. 14 and 17) in the housing 22a for the verbal interactive toy apparatus 20 so that the upstanding portion 74 of cassette housing 26 is disposed between illumination source 88 and photodetector matrix array 90 with the passageways 76, 78, 80 and 82 preferably being in optical registration with the illumination source 88 and photodetector matrix array 90, as illustratively shown in FIG. 2. The illumination source 88 preferably comprises a plurality of conventional light emitting diodes, with 13 such light emitting diodes 94 being utilized in the exemplary configuration of FIG. 7. In addition, if desired, the illumination source 88 may also comprise an equal plurality of conventional optical fibers or light pipes 96 with one such light pipe 96 preferably being provided for each of the light emitting diodes in optical alignment therewith with the entrance end of the light pipe 96 being adjacent the light emitting diode and with the exit end of the light pipe 96 being adjacent a given position with respect to the upstanding portion 74 so as to transmit light in a optical path transversely across a given path intersected by upstanding portion 74 to an adjacent phototransistor 98 located in the photodetector matrix array 90 which preferably comprises a plurality of conventional phototransistors 98 equal in plurality to the plurality of light emitting diodes 94 and associated light pipes 96. There is of course at least one light emitting diode-light pipe 94-96 illumination source associated with each of the light transmitting passageways 76, 78, 80 and 82 provided in upstanding portion 74 and one corresponding phototransistor 98 in the photodetector matrix array 90 associated in optical alignment with these illumination sources 94-96 at the opposite end of the corresponding light transmitting passageways 76, 78, 80 and 82 in upstanding portion 74. However, as shown and preferred in FIG. 7, for added security and in order to attempt to prevent "fooling the system" with unauthorized playback codes, such as by utilizing cassette housings 26 not having an upstanding portion 74 so that all of the illumination provided by illumination source 88 illuminates the complete photodetector matrix array 90, the illumination source 88 and the photodetector matrix array 90 preferably include a plurality of spurious locations which is illuminated by themselves or while the positions associated with the proper predetermined authorization code are also illuminated will provide a disable condition to the verbal interactive toy apparatus 20, thus keeping the circuit open between points 70 and 72 and preventing the operation of the verbal interactive toy apparatus 20, such as by disconnecting the power supply 64. As previously mentioned, FIG. 7 illustrates the use of a total of 13 photodetectors in the photodetector matrix array comprising four photodetectors 98a, 98b, 98c and 98d (FIG. 7.) associated in optical alignment with light transmitting passageways 76, 78, 80 and 82 when the cassette housing 26 is received in receptacle 92 with four corresponding light emitting diodes-light pipe illumination sources 94-96 being associated therewith, and nine photodetectors, 98e through 98m, inclusive, associated with nine such spurious positions which spurious position photodetectors 98e through 98m are in optical alignment with nine corresponding light emitting diodes-light pipe illumination sources 94-96. As shown and preferred in FIGS. 2, 7, 15 and 17, when the cassette housing 26 having the upstanding portion 74 containing the proper or correct predetermined playback authorization code defined by the light passageways 76, 78, 80 and 82 therein is inserted in keyway 92, only photodetectors 98a, 98b, 98c and 98d will be illuminated with the balance of portion 74 preferably serving to block the balance of the optical paths associated with photodetectors 98e through 98m so that these photodetectors will not be illuminated by the corresponding optically aligned illumination sources 94-98.

As shown and preferred in FIG. 7, the condition responsive logic network 86 portion of the playback security system 68 preferably comprises a pair of conventional AND gates 100 and 102 and, in the example shown in FIG. 7, a pair of conventional OR gates 104 and 106 which OR gates 104 and 106 preferably have conventional logic inverters 108 and 110, respectively, connected to the outputs thereof. In addition, a conventional transistor switch 112 is preferably connected to the output of AND gates 102 between points 70 and 72 which switch 112 is normally biased to the open or disable condition providing an open circuit between points 70 and 72 except when an enable signal is provided at the output of AND gate 102 thereby conventionally closing transistor switch 112 so as to complete the circuit between points 70 and 72. As shown and preferred in FIG. 7, the output of AND gate 100 is provided as one input to AND gate 102 via path 114, with the other inputs to AND gate 102 preferably being the output of inverter 108 provided via path 116 and the output of inverter 110 provided via path 118. AND gate 100 is preferably associated solely with the correct predetermined playback authorization code and accordingly the inputs thereto are the outputs of photodetectors 98a, 98b, 98c and 98d provided via paths 120, 122, 124 and 126, respectively. OR gates 104 and 106, on the other hand, are preferably solely associated with the spurious or unauthorized code positions in the photodetector matrix array 90, with OR gate 104 having its input connected to the outputs of photodetectors 98e, 98h, 98i, 98l and 98mm of array 90 via paths 128, 130, 132, 134 and 136, rspectively, and with the inputs of OR gate 106 oreferably being connected to the outputs of photodetectors 98f, 98g, 98j, and 98k of array 90 via paths 138, 140, 142 and 144, respectively. Of course, if desired, only one such OR gate can be utilized. Moreover, more or less spurious or unauthorized code positions can be provided in the photodetector matrix array 90 depending on the desired level of security to be provided by the playback security system 68 as well as on the desired sophistication of the correct predetermined playback authorization code, which sophistication is dependent on the selected desired pattern of light transmitting passageways for upstanding portion 74.

The preferred playback security system 68 illustrated in FIGS. 2, 7, 15 and 17 preferably operates in the following manner. When a cassette housing 26 is inserted in keyway 92, with the illumination source 88 and photodetector matrix array 90 being ON, via a conventional power supply therefor as well as for the logic 86 which power supply is not shown, light provided from the illumination source 94-96 strikes or illuminates the various positions defined by the photodetector matrix array 90. In order for AND gate 100 to provide an authorization logic output condition via path 114, which in the example of the logic shown would be a logic one, all of the inputs 120, 122, 124 and 126 thereto must also be logic 1The photodetectors 98a, 98b, 98c and 98d off array 90 must all be illuminated thereby providing digital signal information comprising the aforementioned logic ones via paths 120, 122, 124 and 126. In such an instance, a logic 1 is provided as an input to the AND gate 102 via path 114. With respect to OR gates 104 and 106, if the inserted cassette housing 26 contains the correct predetermined playback authorization code via the light passageway arrangement of upstanding portion 74, then none of the spurious position photodetectors 98e through 98m in the photodetector matrix array 98 will be illuminated and corespondingly the outputs thereof will be logic zeros, which digital signal information will thereby be present at the corresponding inputs 128 through 144, inclusive, of OR gates 104 and 106. Since all of the inputs, in this instance, to OR gate 104 will be a logic zero, the output thereof provided via path 150 to the input of inverter 108 will be a logic zero and, similarly, since all of the inputs to OR gate 106, in this instance, will be a logic zero, the output of OR gate 106 via path 152 which is provided to the input to inverter 110 will also be a logic zero. In such an instance, the output of inverter 108 via path 116 will be a logic one and, similarly, in such an instance, the output of inverter 110 via path 118 will also be a logic one. Thus, the three inputs to AND gate 102 when solely photodetectors 98a, 98b, 98c and 98d are illuminated, indicating that the cassette housing 26 contains the correct predetermined playback authorization code, will all be logic ones resulting in a logic one or enable output from AND gate 102 via path 154 to enable transistor switch 112, thereby closing switch 112 and completing the circuit path between points 70 and 72 as long as such enable output via path 154 is provided to transistor switch 112. However, if an unauthorized playback authorization code is present with respect to the insertion of a cassette housing 26, so that either any one of the photodetectors 98a, 98b, 98c, 98d associated with the correct predetermined playback authorization code is not illuminated or any one of the photodetectors associated with the spurious locations indicative of an unauthorized playback authorization code, namely photodetectors 98e thhrough 98m, is illuminated, then AND gate 102 will not provide an enable output via path 154 to transistor switch 112, thus leaving transistor switch 112 in a disable condition in which the circuit path between points 70 and 72 is open or, if transistor switch 112 had previously been enabled as described above, then, once again, conventionally disabling transistor switch 112 so as to reopen the circuit path between points 70 and 72. This will occur because if any one of the inputs 120 through 124 to AND gate 100 is a logic zero, such as will occur if an associated photodetector 98a through 98d is not illuminated, then the output of AND gate 100 via path 114 will not be a logic one but instead will be a logic zero whose presence at one of the inputs of AND gate 102 will prevent the provision of the enable signal via path 154 since the output of AND gate 102 in such an instance, cannot be a logic one. Similarly, if any one of the inputs to OR gate 104 is a logic one as will occur if any one of the associated photodetectors 98e, 98h, 98i, 98l or 98m is illuminated, then the output of OR gate 104 via path 150 will be a logic one resulting in a logic zero via path 116 at the output of inverter 108, once again providing a logic zero or disable signal at the output of AND gate 102 via path 154. Similarly, if any one of the inputs to OR gate 106 is a logic one, as will result if any of the associated photodetectors 98f, 98g, 98j or 98k is illuminated, then the output of OR gate 106 via path 152 will be a logic one resulting in a logic zero via path 118 at the output of inverter 110, once again causing a logic 0 or disable signal to be present at the output of AND gate 102 via path 154. All of the logic described above with respect to FIG. 7 is preferably positive logic although, if desired, negative logic could be utilized with corresponding changes in the logic gating network.

Referring now to FIG. 3, an alternative embodiment of the insertion security portion 84 of the preferred playback security system 68 described with reference to FIG. 2 is shown, the only difference therein preferably being in the replacement of the plurality of light emitting diodes, 94 with a single conventional incandescent light source 160 optically associated with the conventional light pipes 96 in a manner previously described with reference to FIG. 2. Of course, if desired, the light pipes 96 could be omitted although the use thereof provides increased accuracy and is presently preferred. Moreover, it should be noted that if desired, passageways 76, 78, 80 and 82 could contain light pipes 96 therein in addition to the aforementioned light pipes or in place thereof.

Referring now to FIGS. 4, 5, 6 and 16, an alternative embodiment of the playback security system 68 of the present invention, generally being referred to by the reference numeral 68a, is shown and shall be described. This embodiment 68a may also be preferably connected between points 70 and 72 (FIG. 1) in place of the embodiment 68 of FIGS. 2, 7, 15 and 17. As with respect to the preferred embodiment of the playback security system 68 previously described with reference to FIGS. 2, 7, 15 and 17, the tape cassette housing 26 preferably includes an upstanding portion 74a similar to previously described upstanding portion 74 having a plurality of passageways therein with four such passageways 76a, 78a, 80a and 82a being provided for providing the same correct predetermined playback authorization code, by way of example, previously described with reference to FIG. 15. In addition, the playback security system 68a also preferably includes an insertion security portion 84a and a condition responsive portion 86a (FIG. 5.) operatively associated therewith for controllably enabling the provision of the playback response from the multitrack tape 24. However, in place of the optically readable code for providing the insertion condition therefrom, a "mechanically readable" code is provided by passageways 76a, 78a, 80a and 82a in conjunction with pin members 180, 182, 184 and 186 comprising the insertion security portion 84a, with one such pin member 180 through 186, inclusive, being provided for each correct position in the correct predetermined athorization code pattern or configuration. As also shown and preferred in FIGS. 5, 6 and 16, the upstanding portion 74a also preferably includes an upstanding protrusion, such as a globe or ball 188 for enabling closure of a conventional spring-biased microswitch 190 contained in the condition responsive portion 86a, when the cassette housing 26 contains the correct predetermined authorization code, as will be described in greater detail hereinafter. Thus, as previously mentioned, the condition responsive portion 86a prreferably includes a spring-biased microswitch 190 connected between points 70 and 72 which switch 190 is preferably normally biased to the disable or open circuit condition providing an open circuit path between points 70 and 72 thus disabling the verbal interactive toy apparatus 20. When the cassette housing 26 is inserted in keyway 92 (FIG. 6), if the correct playback authorization code is defined in upstanding portion 74a, passageways 76a, 78a, 80a and 82a will be mechanically registrable with corresponding pins 180, 182, 184 and 186 so that these pins 180, 182, 184 and 186 will permit insertion of cassette housing 26 into the playback position by extending through the corresponding passageways 76a, 78a, 80a and 82a in upstanding portion 74a. In addition, when these pins 180 through 186 have extended through the corresponding passageways 76a through 82a, globe 188 will be beneath spring-biased microswitch 190 and, because of the confines of the keyway 92 and the location of the microswitch 190 thherein, globe 188 will mechanically force microswitch 190 into the closed position illustrated in FIG. 5 by overcoming the normal bias force of the spring-biased microswitch 190 which normally biases microswitch 190 to the open position, thereby placing switch 190 in the enable condition and completing the circuit path between points 70 and 72, thus enabling the verbal interactive toy apparatus 20. If, however, the correct playback authorization code, or pattern of passageways defining said code, is not provided, then the pins 180, 182, 184 and 186, will prevent the insertion of the cassette housing 26 and, thus, will prevent engagement of means, such as globe 188, for overcoming the biasing force of microswitch 190 to close microswitch 190. Thus, the switch 190 would remain in an open or disable condition, and the playback security system 68a would disable the verbal interactive toy apparatus 20.

Referring now to FIGS. 8 and 9, the presently preferred embodiment of the verbal interactive or conversational user response toy apparatus 20a, similar to the verbal interactive toy apparatus 20 previously described with reference to FIG. 1, employing the preferred playback security systemm 68 or 68a of the present invention is shown. This embodiment 20a is presently preferred for the verbal interactive or real time conversational toy apparatus due to its simplicity over the apparatus 20 of FIG. 1 and is preferably identical with that previously described with reference to FIG. 1 with the primary exception being that in place of the multitrack head 34 and corresponding multichannel audio amplifier 36, such as the four tack head and four channel audio amplifier in the example of FIG. 1, a conventional single track magnetic playback head 34a and conventional single channel audio amplifier 36a are utilized with the head 34a being mechanically shiftable from track to track in accordance with a mechanical selection mechanism to be described with reference to FIG. 9, as opposed to employing a multitrack head 34 which is electronically shifted from track to tack although not physically moving as would occur in the case of the single track head 34a. Referring now to FIG. 9, a diagrammatic illustration of the presently preferred mechanical arrangement of the selection buttons or switches 40 through 56, inclusive, is shown. These switches 40 through 56, inclusive, as previously mentioned, are preferably conventional pushbutton spring-loaded switches having a conventional mechanical interlock between the switches 40 through 56, with the conventional mechanical interlock, represented by reference numeral 200, conventionally operating to allow only one switch or button 40 through 56, inclusive, to be depressed at a time while disengaging the corresponding depressed button as another subsequent button is depressed, such as in the key button system conventionally utilized in a conventional key telephone system. In addition, the switches or buttons 40 through 56, inclusive, are conventionally mechanically interconnected to tape head 34a through a conventional mechanical connecting bar 202 and fulcrum arrangement 204, 206, 208, 210 and 212 with buttons 42, 44 and 46 being further mechanically interconnected so that only one thereof may be depressed at a time, with buttons 48, 50 and 52 being similarly mechanically interconnected so that only one can be depressed at a time and withh buttons 54 and 56 being similarly mechanically interconnected so that only one thereof can be depressed at a time, the depression of a given button or switch 40 through 56 inclusive, in connection with the associated fulcrum 206 through 212, inclusive, and fulcrum 204 and connecting bar 202 conventionally mechanically moving or pivoting head 34a to the appropriate track associated with the button being depressed. Thus, the depression of any one of buttons 42, 44 or 46 moves head 34a to track A, the depression of any of button 48, 50 or 52 moves head 34a to track B, the depression of either buttons 54 or 56 moves head 34a to track C and the depression of button 40 moves head 34a to track D, in the example being described herein.

As shown and preferred in FIGS. 13 and 14, the verbal interactive toy apparatus 20 or 20a is preferably housed in a robot-like housing 22a, such as the type of robot-like housing described in U.S. Pat. No. 3,947,972 for enhancing the verbal interactive or conversational real time user response apparatus environment of the toy. Such a robot-like housing, may preferably include a head portion 220 which is shown, by way of example, as having eyes, a nose and a mouth arranged in the exemplary correct predetermined playback authorization code with, if desired, a globe 222 at the top thereof which may contain a globe lamp 222 of the type described with reference to U.S. Pat. No. 3,947,972. The housing 22a preferably includes the buttons 40 through 56, inclusive, arrayed on the front thereof. However, as shown and preferred, a removable template 224 having corresponding alignable apertures therein, is preferably placeable over the button array 40 through 56, and removably held thereon, such as by means of conventional Velcro strips 226 and 228, for labeling the buttons 40 through 56, inclusive, dependent on the information stored on the multitrack tape 24 to be used at a given time in the housing 22a. As previously described, the front of the housing 22a also preferably includes keyway 92 for enabling insertion of the cassette housing 26 therein. Thus, for example, the template 224 may comprise the label arrangement for buttons or switches 40 through 56, illustrated in FIGS. 1, 8, 9 and 10 for one type of information storage or, by way of another example, may comprise the label configuration illustrated in FIG. 13 if the information stored on the multitrack tape 26 is to be a mathematical information format where it may be desired to have button 40 correspond to the "question," button 42 corresponnd to "choice A," button 44 correspond to "greater than," button 46 correspond to "true," button 48 correspond to "choice B," button 50 correspond to "false," button 52 correspond to "less than," button 54 correspond to "choice C" and button 56 correspond to "equal to." Any other desired "label configuration" could also be provided dependent on the information stored on the tape 4 with the correct template 224, if desired, being provided along with the corresponding tape 24, thus increasing the play value of the toy by significantly increasing its flexibility. If desired, the aforementioned robot-like housing 22a may also include mechanically movable arms 230 and 232 and legs 234 and 236 whose mechanical movement may be conventionally accomplished for further increased play value.

Figure 10:
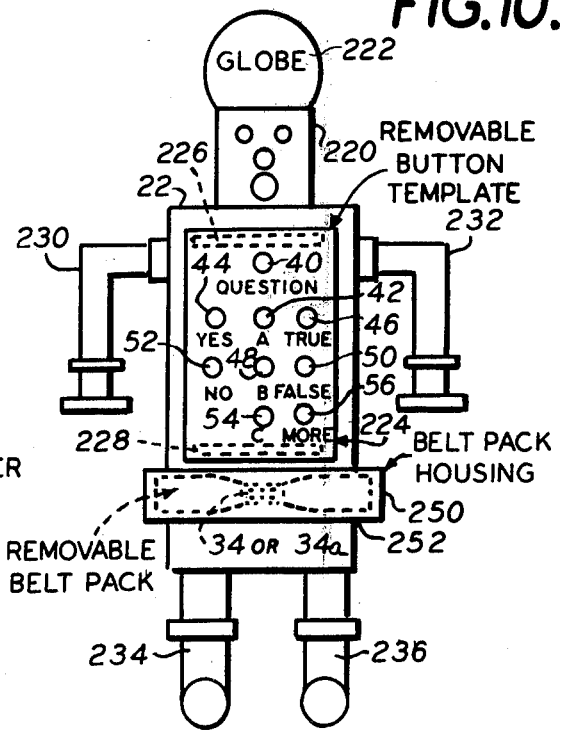
FIG. 10 is a front elevational view of a preferred robot-like housing for the verbal interactive toy of either FIG. 1, 8 or 9 including means for employing the playback security system of FIG. 12.

Referring now to FIG. 10, another embodiment of a robot-like housing 22 for the verbal interactive toy playback apparatus 20 or 20a of the present invention is shown. Preferably, robot-like housing 22 is identical with previously described robot-like housing 22a (FIG. 14) with the exception of the provision of a belt pack housing 250 in which a removable belt pack 252 to be described with reference to FIGS. 11 and 12 is removably insertable, with the belt pack housing 250 and removable belt pack 252 providing a playback security system for the verbal interactive toy apparatus 20 or 20a housed in robot-like housing 22 in place of the previously described playback security system 68 or 68a. Such an arrangement 250-252 is also preferably electrically connected between points 70 and 72 (FIG. 1) in place of the previously described embodiments 68 or 68a. As shown and preferred in FIG. 11, the belt pack housing 250 preferably comprises a unique receptacle configuration in place of keyway 92 with an exemplary configuration being illustrated in FIG. 11 having uniquely configured insert portions 254, 256, 258, 260 and 262 providing a predetermined playback authorization code insertion configuration. Portion 258 preferably comprises the location of the conventional spindles 264 and 266 for the storage and take-up reels 27a and 29a for the tape 24 as well as containing the capstan drive 28-30-32 mechanism therefor. In addition, the magnetic playback head 34 or 34a is preferably located therein in playback alignment with the inserted tape 24. As further shown in FIG. 12, the removably insertable belt pack 252 preferably comprises a complementary geometric configuration of protrusions 254a, 256a, 258a, 260a and 262a which when belt pack 252 is inserted in belt pack housing 250, fit into the corresponding complementary apertures 254 through 262, as indicated by the dotted lines extending between FIGS. 11 and 12. In addition, the protrusion 262a on the belt pack 252 is arranged so that when it is inserted into complementary aperture 262, it will close a conventional electrical interlock 190a, such as the conventional spring-biased microswitch 190 previously described with reference to FIGS. 4 through 6. This electrical interlock 190a is preferably interconnected between points 70 and 72, as was described with reference to the playback security system 68 or 68a for enabling the verbal interactive toy apparatus 20 or 20a when inserted therein and disabling the verbal interactive toy apparatus 20 or 20a when such electrical interlock 190a is not closed, the switch 190a normally being biased to the disable or open circuit condition. Thus, belt pack 252 may be utilized in place of the type of tape cassette housing 26 previously described with reference to the playback security system 68 or 68a with the unique pattern of complementary protrusions 254a through 262a providing the playback authorization code. Preferably, the tape 24 is permanently secured to the belt pack 252 so that a different belt pack 252 would normally have to be utilized to provide a different tape 24 for insertion in the robot-like housing 22 to be played back on the playback apparatus 20 or 20a.

If desired, as shown in FIG. 18, and in dotted lines in FIG. 11, a plurality of identical type electrical interlocks 109a-190d, inclusive, may be utilized in belt pack housing 250 with one such electrical interlock 190b, 190c, 190d and 190a, respectively being associated with each complementary aperture or receptacle 254, 256, 258, 260 and 262, respectively, by way of example. In such instance, each of the interlocks 190a-190d, inclusive, comprises a connventional spring-biased microswitch identical to switch 190, normally spring biased to the open circuit or disable condition. As shown and preferred in FIG. 18, this plurality of switches 190a-190d, inclusive, are preferably electrically interconnected in series between points 70 and 72 for keeping the verbal interactive toy apparatus 20 or 20a in a disable condition unless all of the switches 190a, 190b, 190c and 190d are simultaneously closed by insertion of corresponding complementary protrusions 262a, 254a, 256a and 260a in corresponding apertures 262, 254, 256 and 260, respectively, as was previously mentioned with respect to switch 190a, thereby corresponding to provision of the correct predetermined playback authorization code. If all of the required complementary protrusions are not present on a belt pack 252 being inserted in belt pack housing 250, then the series circuit of FIG. 18 between points 70 and 72 will not be completed and an open circuit or disable condition for the verbal interactive toy apparatus 20 or 20a will remain.

Preferably, unlike the sophisticated conversational student response teaching apparatus described in U.S. Pat. No. 3,947,972, the verbal interactive toy apparatus or conversational user response toy playback apparatus 20 or 20a described herein which forms a part of the invention described in the aforementioned commonly owned copending U.S. patent applications, contains a single primary question or interrogatory message track with the other three remaining tracks in the example given, all simultaneously preferably containing the same question at the same time and thereafter containing various types of responsive messages with the responsive messages and the interrogatory messages being preferably related in real time and content to one another in a conversational real time environment so as to provide an enhanced educational value to the user, such as in the preferred robot-like environment illustrated in FIGS. 10 and 14. While the other three tracks contain responsive messages to the question, the primary question track preferably contains additional instructional information. Thus, for a particular real time related interrogatory message contained on the question track, such as track D, the tracks containing the incorrect responsive messages for the particular interrogatory message may preferably contain instructional messages corresponding to selection of an incorrect responsive message which are related in real time and content to the particular interrogatory message contained on track D or may also contain additional information labeled "more" on a given topic. For example, each of the responsive tracks can initially contain a responsive multiple choice message further indicating that if the user wishes to learn more about the topic of the question asked then he should push the "more" button. In such an instance, the "more" button 56 which is connected in parallel to button 54 associated with track C would be depressed by the user and a predetermined length segment of additional information relating to the topic would be provided. If the user, however, did not want additional information, then the next interrogatory message on track D would be confined to selection of an answer or responsive message contained on tracks A and B whose extent in time would be equivalent to the extent in time of the additional information contained on track C. Thus, as previously mentioned, the various information segments on the tape 24 are set up so as to be time related. Moreover, this time relationship allows a multiple use of the type previously described herein of each of the tracks. For example, as mentioned above, in the instance where "mmore" information is to be provided, then the next question on track D could be confined to a "YES/NO" or a "TRUE/FALSE" question if desired. Since the desired verbal interactive toy apparatus 20 or 20a is preferably to be employed as a verbal interactive toy, the sophistication of the apparatus described in U.S. Pat. No. 3,947,972 is not desired and the multiple use switches or buttons are readily distinguishable therefrom so as to enable the outward appearance and operation of the sophisticated system of U.S. Pat. No. 3,947,972 to the user while, in reality, providing a much more simplified configuration for accomplishing the same type of conversational response environment. Depending on the verbal interactive toy apparatus 20 or 20a being utilized, a single one of the tracks, in the instance of the single track head 34a of the presently preferred verbal interactive toy apparatus 20a, or all of the tracks A through D, in the instance of a multitrack head 34 for the verbal interactive toy apparatus 20 may be simultaneously played back through the playback head in real time. Any one of these tracks is capable of being selected in real time and, as previously mentioned, all of these tracks are related in real time and content in a conversational manner. Preferably, as previously mentioned, although track D is essentially the question track, in the preferred verbal interactive toy, all of the tracks simultaneously contain the question prior to selection of a responsive message thereto with the exception that when the "more" information condition is present, that track, track C by way of example, does not contain the question being asked on the other tracks while more information is provided. This function is different from the system described in U.S. Pat. No. 3,947,972, where one track and one track only was exclusively a question or interrogatory message track. In order to understand the conversational responsive environment of the preferred verbal interactive toy apparatus 20 or 20a, a sample real time and content related information storage program for magnetic tape 24 is illustrated below, the stored information on the tape and the various tracks being spatially related to each other along the tracks in real time to provide the conversational responsive environment. In considering this example, it should be noted that, if desired, verbal interactive toy apparatus 20 or 20a may be placed in a hold mode by opening switch 66 so that the user may stop the tape 24 from being moved in real time and perform activity relating to the interrogatory message contained on the tracks of the tape 24 before selecting an appropriate responsive message track. Moreover, in the example given below, track D, the "question" track is illustratively placed on top of the three other tracks A, B and C.

"SAMPLE PROGRAM FOR VERBAL INTERACTIVE TOY ROBOTS"

| | |
|---|---|
| Q | Where does the word news come from ? I will give you three choices; A the Greek word for nap, snooze; B the points on a compass, or C nobody knows. |
| Y A | Where does the word news come from ? I will give you three choices; A the Greek word for nap, snooze; B the points on a compass, or C nobody knows. |
| N B | Where does the word news come from ? I will give you three choices; A the Greek word for nap, snooze; B the points on a compass, or C nobody knows. |
| MORE C | Where does the word news come from ? I will give you three choices; A the Greek word for nap, snooze; B the points on a compass, or C nobody knows. |
| Q | Choose A, B, or C now . . . you chose no answer. You are a big dummy. Just wait and I will ask you another question . . . I know you are still |
| Y A | Choose A, B, or C now . . . you chose A and you are not correct. The word news comes from the points of a compass N, north; E, east; W, west, and |
| N B | Choose A, B, or C now . . . you chose B and you are correct. N, north; E, east; W, west, and S, south. You are correct and a very smart child. |
| MORE C | Choose A, B, or C now . . . you chose C and you are not correct. The word news comes from the points on a compass N, north; E, east; W, west; and |
| Q | waiting but you should have chosen an answer . . . To learn about a compass, push MORE button . . . I can see you don't like to push buttons |
| T Y A | S, south. If you would like to learn more about the compass push the "MORE" button now . . . Since you have not selected "MORE" I will ask |
| F N B | If you would like to learn more about the compass push the "MORE" information button now . . . Since you have not selected "MORE" I will ask |
| MORE C | S, south. If you would like to learn more about the compass push the "MORE" button now . . . Thank you. A compass is a device that |
| Q | much . . . This is a true/false question. Columbus discovered America in 1520. Answer true or false now . . . |
| T Y A | you another question . . . This is a true/false question. Columbus discovered America in 1520. Answer true or false now . . . |
| F N B | you another question . . . This is a true/false question. Columbus discovered America in 1520. Answer true or false now . . . |
| MORE C | enables a person to determine direction. Since there are large magnetic deposits at the north pole, a magnetic compass will point to the |
| Q | You have not chosen. It is too late . . . Keep waiting . . . Here is your next question etc. etc. |
| T Y A | ,Not correct. Columbus discovered America in 1492. You chose the wrong answer . . . Here is your next question etc. etc. |
| F N B | ,Correct, Correct. Columbus discovered America in 1492 as you probably know. Good work . . . Here is your |

"SAMPLE PROGRAM FOR VERBAL INTERACTIVE TOY ROBOTS" -continued

|   | next question etc. etc. |
|---|---|
| MORE C | north pole from anywhere on earth. This can help a traveler find his way . . . Here is your next question etc. etc. |

KEY
Q = question channel
A = answer channel A
B = answer channel B
C = answer channel C
T = true (same as A)
F = false (same as B)
Y = yes (same as A)
N = no (same as B)
MORE = more information In the example given above, it should be noted that the information stored on each of the tracks A through D is continuous on the tape 24 with blank spaces being provided at appropriate real time related intervals on the tape 24 for the appropriate tracks so as to relate the information stored on the various tracks A through D in real time and content, such time relation being illustratively shown in the above example by the illustrative alignment of the information illustrated above.

Accordingly, by utilizing the verbal interactive or conversational user response toy apparatus of the present invention, a secure real time conversational playback response to an interrogatory message may readily be provided for insuring that only properly authorized tapes are playable on the verbal interactive toy apparatus, such as for insuring that only tapes having the proper conversational format could be utilized in the preferred verbal interactive or conversational response toy.

It is to be understood that the above described embodiments of the invention are merely illustrative of the principles thereof and that numerous modifications and embodiments of the invention may be derived within the spirit and scope thereof.

What is claimed is:

1. A real time conversational verbal interactive toy apparatus comprising a removably insertable magnetic storage medium having a housing for said storage medium, said magnetic storage medium comprising a plurality of coextensive multipurpose audio tracks capable of having audio information stored thereon for multipurpose audio playback therefrom; receptacle means for removably receiving said inserted storage medium housing wiith said storage medium in a playback position thereof; audio playback means adjacent said multitrack storage medium and in alignment therewith in said playback position of said received inserted storage medium housing for selectively obtaining said stored audio information from each of said coextensive tracks; multiple choice multipurpose selection means operatively connected to said playback means for directly selecting one of said tracks for reproducing said selected information stored thereon in accordance with a predetermined variable purpose for said multipurpose audio track; and audio output means operatively connected to said playback means and said direct selection means for directly providing said selected track information from said selectively obtained stored audio information for selectively reproducing said information as an audio output therefrom, said information being stored on each track in a plurality of reproducible information segments, each of said segments comprising a complete message reproducible by said playback means directly in response to the selection of said track upon which said segments are stored, each of said information segments on each of said coextensive tracks being spatially related in real time along said tracks and related in content to said information segments on the other of said coextensive tracks in said plurality thereof, said selection means comprising means for designating only one of said coextensive tracks as an interrogatory message track with said information stored thereon comprising interrogatory messages and for designating said other of said coextensive tracks as responsive message tracks with said stored information thereon conprising selectable responsive messages spatially related along said other tracks in said real time and related in content to said interrogatory messages on said one designated interogatory message track dependent on said predetermined purpose for said multipurpose tracks, each of said tracks having substantially the same associated track width, said verbal interactive toy having a timed relationship between adjacent successive interrogatory messages solely dependent on the spatial relationship between said adjacent successive interrogatory messages on said one designated interrogatory message track and said responsive messages on said other tracks whereby said verbal interactive toy apparatus is capable of controlling verbal interaction in real time solely dependent on said spatial relationship, said interrogatory message containing a predetermined category of response thereto, each of said predetermined variable purposes corresponding to a different category of response to said interrogatory messages on said designated interrogatory message track, said multipurpose selection means enabling said category of response to be varied in accordance with a variation in said predetermined category of response contained in said interrogatory message on said designated real time related interrogatory message track; insertion security means operatively associated with said receptacle means for providing an insertion condition for said inserted received multitrack magnetic storage medium housing with respect to said receptacle means, said multitrack storage medium housing having means disposed thereon comprising a playback authorization code for reproduction from said multitrack storage medium, said insertion security means comprising means responsive to said playback authorization code for providing said insertion condition therefrom; and condition responsive means operatively associated with said insertion security means for controllably enabling the provision of said selectable reproduction of said selected information from said multitrack storage medium, said playback means having an enable condition and a disable condition for enabling the provision of said selectable reproduction therefrom only in said enable condition thereof, said condition rsponsive means being responsive to said insertion security means provided insertion condition for providing said enable condition to said playback means only when said provided insertion condition corresponds to a predetermined playback authorization code, whereby only a magnetic storage medium capable of providing said real time conversational type response to an interrogatory message may be employed in said verbal interactive toy apparatus for ensuring secure provision of said real time conversational type response; said multiple choice multipurpose selection means comprising a plurality of switch means, one of said switch means being associated with each of said plurality of audio tracks, at least one of said switch means associated with one of said selectable other designated responsive message tracks comprising a parallel connected switch bank having a plurality of separately operable different single purpose switch members, each of said different single purpose corresponding to a different category of response to an associated real time related interrogatory message, means associated with said switch bank whereby only one of said switch members is operable at a time for said direct selection of said one associated track dependent on said predetermined category of response, said predetermined category of response being defined in said real time related interrogatory message on said interrogatory message track, whereby the category of multiple choice response to said interrogatory messages may be varied and said real time conversational type response may be ensured for each category; said one interrogatory message containing track further comprising associated multiple choice selectable responses to a particular interrogatory message, said other tracks comprising responsive messages related in real time and content to said interrogatory messages and corresponding to said multiple choice selectable responses, only one of said plurality of other tracks comprising the correct selectable responsive message to a particular real time related interrogatory message.

2. An apparatus in accordance with claim 1 wherein one of said plurality of other tracks further comprises additional descriptive information relating to the content of said correct selectable responsive message, said designated interrogatory message track containing a subsequent different particular interrogatory message related in real time but unrelated in content to said additional information on said one additional information containing track with said other responsive message tracks containing selectable responsive messages related in real time and content to said subsequent different particular interrogatory message and related in real time but unrelated in content to said additional information, said switch means associated with said other responsive message tracks having a different selectable purpose for said subsequent different particular interrogatory message than for said particular interrogatory message related to said additional information, whereby secure real time conversational type multipurpose selection and response to successive interrogatory messages may be provided for said verbal interactive toy apparatus.

3. An apparatus in accordance with claim 2 wherein each of said switch means associated with said responsive message containing tracks comprises a multiple purpose parallel connected switch bank having a separately operable switch member for each of said multiple purposes, only one of said switch members being operable at a time for said direct selection of said associated track dependent on said predetermined purpose, said predetermined purpose being defined in said real time related interrogatory message on said interrogatory message track.

4. An apparatus in accordance with claim 3 wherein said other designated responsive message tracks further comprise said particular interrogatory message identical in content and spatially related in real time along said tracks to said particular interrogatory message on said one designated interrogatory message track, wiith said selectable responsive messages to said particular interrogatory message being adjacent thereto and spatially related in real time along said tracks to said particular interrogatory message.

5. An apparatus in accordance with claim 4 wherein said audio playback means comprises a movable single track audio playback head selectively movable from track to track of said multitrack magnetic storage medium dependent on said track selected, said multiple choice multipurpose selection means comprising means for moving said single track audio playback head into alignment with said selected track for enabling said reproducing of said selected information stored thereon when sad provided insertion condition corresponds to a predetermined playback authorization code.

6. An apparatus in accordance with claim 1 wherein said audio playback means comprises a movable single track audio playback head selectively movable from rack to track of said multitrack magnetic storage medium dependent on said track selected, said multiple choice multipurpose selection means comprising means for moving said single track audio playback head into alignment with said selected track for enabling said reproducing of said selected information stored thereon when said provided insertion condition corresponds to a predetermined playback authorization code.

7. An apparatus in accordance with claim 1 wherein said other designated responsive message tracks further comprise said particular interrogatory message identical in content and spatially related in real time along said other tracks to said particular interrogatory message on said one designated interrogatory message track with said selectable responsive messages to said particular interrogatory message being adjacent thereto and spatially related in real time along said tracks to said particular interrogatory message.

8. An apparatus in accordance with claim 1 wherein said multiple choice multipurpose selection means comprises a removable template having a plurality of indicia thereon associated with the possible predetermined purposes for said selectable tracks on a particular inserted multitrack storage mediumm, said template being changeable dependent on said possible predetermined purposes.

9. An apparatus in accordance with claim 1 wherein said condition responsive means comprises logic gating means responsive to said insertion condition for providing said enable condition.

10. an apparatus in accordance with claim 9 wherein said authorization code comprises an optically readable code, said insertion security means responsive to said playback authorization code comprising means responsive to said optically readable code for providing a digital signal therefrom to said logic gating means, said digital signal comprising said insertion condition, said logic gating means being responsive to said provided digital signal for providing said enable condition only when said provided digital signal corresponds to said predetermined authorization code.

11. An apparatus in accordance with claim 10 wherein said digital signal providing means comprises means for providing digital signal information corresponding to an unauthorized playback code and digital signal information corresponding to said predetermined playback authorization code, said logic gating means comprising first AND gate means operatively connected to said digital signal providing means for solely receiving said digital signal information corresponding to said predetermined authorization code for providing a first authorization logic output condition when said digital signal information corresponding to said predetermined authorization code is received thereby, second OR gate means operatively connected to said digital signal providing means for solely receiving said digital signal information corresponding to said unauthorized playback code for providing a first state output condition when said digital signal information corresponding to said unauthorized playback code is received thereby and a second state output condition when said digital signal information corresponding to said unauthorized playback code is not received thereby, first logic inverter means operatively connected to the output of said second OR gate means for inverting said state output condition thereof for providing a second authorization logic output condition from said first logic inverter means only when said second state output condition is provided thereto from said second OR gate means, and third AND gate means operatively connected to said first AND gate means and said first logic inverter means means outputs for providing said enable condition solely when said first and second authorization logic output conditions are present.

12. An apparatus in accordance with claim 11 wherein said enable condition providing means further comprises transistor switch means operatively connected to said third AND gate means output for providing said enable condition solely when said first and second authorization logic output conditions are present.

13. An apparatus in accordance with claim 12 further comprising power source means for providing power to enable operation of said audio playback means, said transistor switch means being operatively connected between said power source means and said audio playback means for enabling provision of said power to said audio playback means solely in said enable condition thereof.

14. An apparatus in accordance with claim 13 wherein said digital signal providing means comprises a photodetector matrix array and an illumination source optically registrable therewith, said optically readable authorization code providing means comprising a plurality of light transmitting passageways in said housing disposable in said insertion security means between said illumination source and said photodetector matrix array in optical registration therewith for enabling selective illumination of said photodetector matrix array through said housing light transmitting passageways for providing said digital signal information dependent on said selectively illuminated photodetector matrix array, said photodetector matrix array being operatively connected to said first AND gate means and second OR gate means for providing said digital signal information thereto.

15. An apparatus in accordance with claim 14 wherein said photodetector matrix array comprises a plurality of photodetectors and said illummination source comprises an equal plurality of light emitting diodes with each one of said diodes being optically registrable with a given one of said photodetectors in said matrix array.

16. An apparatus in accordance with claim 14 wherein said matrix array comprises a plurality of photodetectors and said illumination source comprises a plurality of light transmitting optical fibers with each one of said fibers being optically registrable with a given one of said passageways for illuminating a given one of said photodetectors in said array.

17. An apparatus in accordance with claim 14 wherein said photodetector matrix array comprises a plurality of phototransistors.

18. An apparatus in accordance with claim 11 wherein said digital signal providing means comprises a photodetector matrix array and an illumination source optically registrable therewith, said optically readable authorization code providing means comprising a plurality of light transmitting passageways in said housing disposable in said insertion security means between said illumination source and said photodetector matrix array in optical registration therewith for enabling selective illumination of said photodetector matrix array through said housing light transmitting passageways for providing said digital signal information dependent on said selectively illuminated photodetector matrix array, said photodetector matrix array being operatively connected to said first AND gate means and second OR gate means for providing said digital signal information thereto.

19. An apparatus in accordance with claim 18 wherein said photodetector matrix array comprises a plurality of photodetectors and said illumination source comprises an equal plurality of light emitting diodes with each of said diodes being optically registrable with a given one of said photodetectors in said matrix array.

20. An apparatus in accordance with claim 18 wherein said matrix array comprises a plurality of photodetectors and said illumination source comprises a plurality of light transmitting optical fibers with each one of said fibers being optically registrable with a given one of said passageways for illuminating a given one of said photodetectors in said array.

21. An apparatus in accordance with claim 18 wherein said photodetector matrix array comprises a plurality of phototransistors.

22. An apparatus in accordance with claim 1 further comprising power source mmeans for providing power to enable operation of said audio playback means, said condition responsive means being operatively connected between said power source means and said audio playback means for enabling provision of said power to said audio playback means solely in said enable condition thereof.

23. An apparatus in accordance with claim 1 wherein said receptacle means comprises a unique keyway for insertion of said housing for controllably enabling placement of said housing with said storage medium in said playback position thereof, said disposed housing authorization code means comprising means cooperable with said keyway for enabling said housing insertion.

24. An apparatus in accordance with claim 1 wherein said insertion security means further comprises detection means disposed in cooperation with said receptacle means for positively defining a composite detection pattern cooperable with said playback authorization code disposed on said storage medium housing, said composite detection pattern detection means comprising a first plurality of detectors dispersed throughout said composite pattern solely in positions defining a pattern corresponding to said predetermined playback authorization code and a second plurality of detectors dispersed throughout said first plurality of predetermined playback authorization code corresponding pattern defining detectors solely in predetermined positions positively defining spurious locations in said playback authorization code corresponding pattern, said insertion condition providing playback authorization code responsive means comprising means responsive to both said first and second plurality of detectors for providing said insertion condition, said condition responsive means providing said enable condition when said provided insertion condition corresponds solely to said predetermined playback authorization code and said positively defined spurious locations are not detected, whereby the provision of an erroneous enable condition is minimized upon insertion of an unauthorized storage medium housing in said receptacle means.

* * * * *